United States Patent
Droz et al.

(10) Patent No.: US 10,989,886 B2
(45) Date of Patent: *Apr. 27, 2021

(54) METHODS FOR OPTICAL SYSTEM MANUFACTURING

(71) Applicant: Waymo LLC, Mountain View, CA (US)

(72) Inventors: Pierre-Yves Droz, Los Altos, CA (US); David Schleuning, Piedmont, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/705,406

(22) Filed: Dec. 6, 2019

(65) Prior Publication Data
US 2020/0110233 A1 Apr. 9, 2020

Related U.S. Application Data

(63) Continuation of application No. 16/136,429, filed on Sep. 20, 2018, now Pat. No. 10,534,143.

(51) Int. Cl.
*G02B 6/32* (2006.01)
*G02B 6/42* (2006.01)
*G01S 7/481* (2006.01)

(52) U.S. Cl.
CPC ......... *G02B 6/4226* (2013.01); *G02B 6/4206* (2013.01); *G02B 6/4221* (2013.01); *G01S 7/4815* (2013.01); *G01S 7/4818* (2013.01)

(58) Field of Classification Search
CPC .. G02B 6/4226; G02B 6/4221; G02B 6/4206; G01S 7/4815; G01S 7/4818
See application file for complete search history.

(56) References Cited

U.S. PATENT DOCUMENTS

| 4,897,711 A | 1/1990 | Blonder et al. |
| 5,627,931 A | 5/1997 | Ackley et al. |
| 5,771,322 A | 6/1998 | Matsumoto et al. |
| 6,160,250 A * | 12/2000 | Miksch ............... H04N 1/0311 235/462.45 |

(Continued)

FOREIGN PATENT DOCUMENTS

| EP | 1804075 A2 | 7/2007 |
| JP | 2013521508 A | 6/2013 |

OTHER PUBLICATIONS

International Search Report and Written Opinion, dated Jan. 3, 2020, in International Patent Application No. PCT/US2019/051634.

*Primary Examiner* — Ellen E Kim
(74) *Attorney, Agent, or Firm* — McDonnell Boehnen Hulbert & Berghoff LLP

(57) ABSTRACT

Systems and methods described herein relate to the manufacture of optical elements and optical systems. An example method includes providing a first substrate that has a plurality of light-emitter devices disposed on a first surface. The method includes providing a second substrate that has a mounting surface defining a reference plane. The method includes forming a structure and an optical spacer on the mounting surface of the second substrate. The method additionally includes coupling the first and second substrates together such that the first surface of the first substrate faces the mounting surface of the second substrate at an angle with respect to the reference plane.

20 Claims, 10 Drawing Sheets

(56) References Cited

U.S. PATENT DOCUMENTS

| | | |
|---|---|---|
| 6,414,779 B1 | 7/2002 | Mandella et al. |
| 6,456,766 B1 | 9/2002 | Shaw et al. |
| 6,530,697 B1 * | 3/2003 | Johnson ............. G02B 6/29311 385/33 |
| 6,786,654 B2 | 9/2004 | Kilian |
| 7,254,301 B2 | 8/2007 | Hoshino et al. |
| 7,547,151 B2 | 6/2009 | Nagasaka |
| 9,323,014 B2 | 4/2016 | Levy |
| 9,581,772 B2 | 2/2017 | Lan et al. |
| 9,960,105 B2 * | 5/2018 | Jiang ................... H01L 21/4853 |
| 10,534,143 B1 | 1/2020 | Droz et al. |
| 2002/0075566 A1 | 6/2002 | Tutt et al. |
| 2005/0079716 A1 | 4/2005 | Yoshihara et al. |
| 2006/0170088 A1 | 8/2006 | Lee et al. |
| 2009/0065678 A1 * | 3/2009 | Vandermeulen ..... H05K 3/3436 250/206 |
| 2009/0128879 A1 | 5/2009 | Kuribayashi |
| 2013/0027240 A1 | 1/2013 | Chowdhury |
| 2013/0243376 A1 | 9/2013 | Choraku et al. |
| 2013/0330035 A1 * | 12/2013 | Shin ..................... G02B 6/4207 385/14 |
| 2014/0124917 A1 * | 5/2014 | Lee ...................... G02B 6/4226 257/737 |
| 2015/0010270 A1 | 1/2015 | Oppermann |
| 2018/0081118 A1 | 3/2018 | Klamkin et al. |

* cited by examiner

METHODS FOR OPTICAL SYSTEM MANUFACTURING

CROSS-REFERENCE TO RELATED APPLICATIONS

This application is a continuation of application Ser. No. 16/136,429, filed Sep. 20, 2018, which is incorporated herein by reference.

BACKGROUND

Unless otherwise indicated herein, the materials described in this section are not prior art to the claims in this application and are not admitted to be prior art by inclusion in this section, Achieving and maintaining proper alignment between optical components in a complex optical system can represent a formidable manufacturing challenge. For example, some optical systems include parts that should be arranged according to placement tolerances that can be 50 microns, 10 microns, or even less.

SUMMARY

Systems and methods described herein are applicable to the manufacture of optical systems. For example, the present disclosure describes certain optical components (e.g., light guide devices and optical lenses) and methods of their manufacture to provide an optical system.

In a first aspect, a method for manufacturing an optical system is provided. The method includes providing a first substrate. The first substrate has a first surface and a second surface opposite the first surface. A plurality of light-emitter devices is disposed on the first surface. The method includes providing a second substrate. The second substrate has a mounting surface that defines a reference plane. The method additionally includes forming a structure and an optical spacer on the mounting surface of the second substrate. The method further includes coupling at least one spacer to the mounting surface of the second substrate. The method yet further includes coupling at least one cylindrical lens to the mounting surface of the second substrate. The method includes coupling the first and second substrates together such that a first portion of the first substrate is coupled to the mounting surface of the second substrate and a second portion of the first substrate is coupled to the optical spacer formed on the mounting surface of the second substrate and the first surface of the first substrate faces the mounting surface of the second substrate at an angle with respect to the reference plane.

In a second aspect, an optical system is provided. The optical system includes a first substrate. The first substrate has a first surface and a second surface opposite the first surface. A plurality of light-emitter devices is disposed on the first surface. The optical system also includes a second substrate. The second substrate has a mounting surface that defines a reference plane. The second substrate includes a structure and an optical spacer on the mounting surface, at least one spacer coupled to the mounting surface, and at least one cylindrical lens coupled to the mounting surface. The first substrate and the second substrate are coupled together such that a first portion of the first substrate is coupled to the optical spacer on the mounting surface of the second substrate and the first surface of the first substrate faces the mounting surface of the second substrate at an angle with respect to the reference plane.

Other aspects, embodiments, and implementations will become apparent to those of ordinary skill in the art by reading the following detailed description, with reference where appropriate to the accompanying drawings.

DETAILED DESCRIPTION

Figure 1:
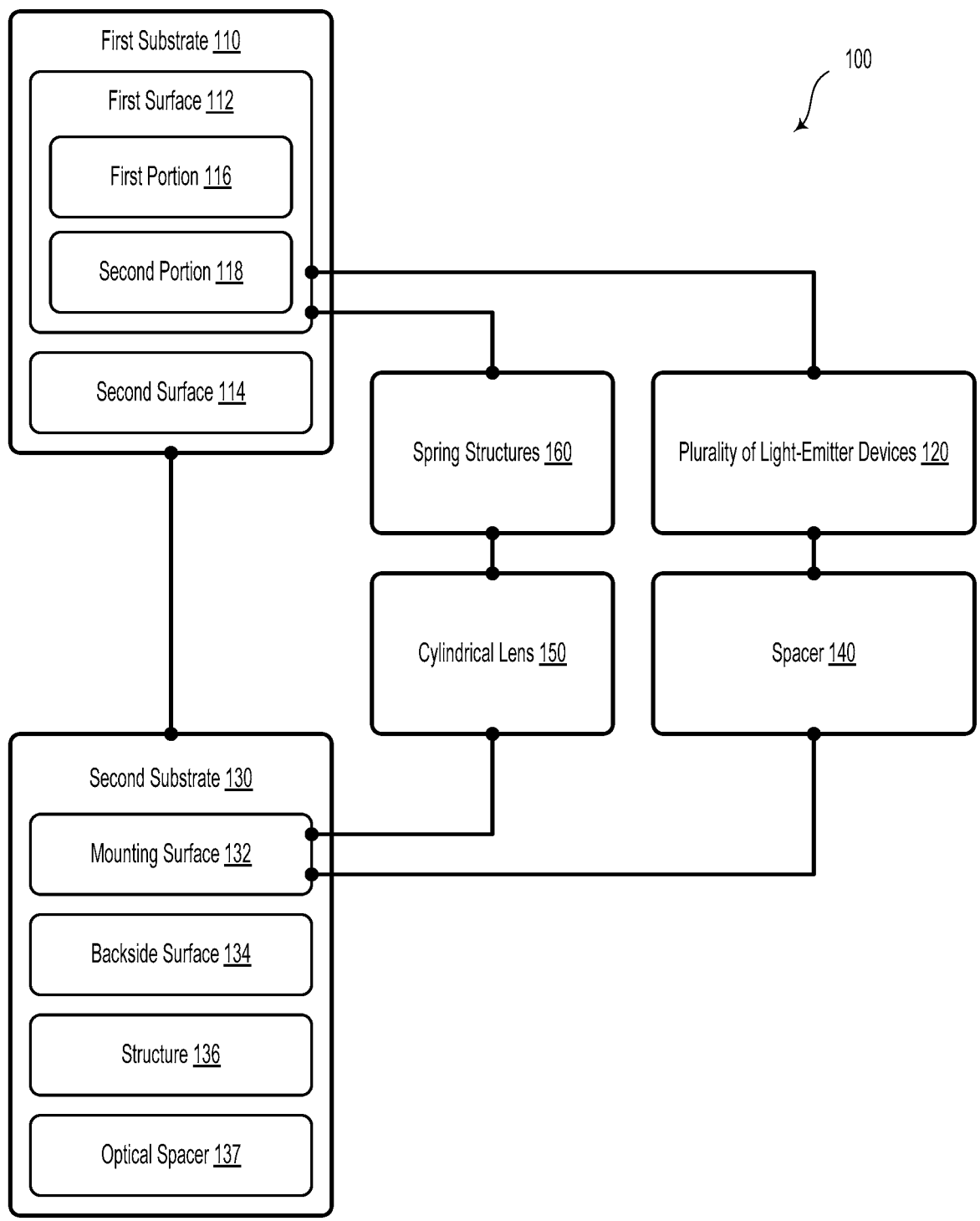
FIG. 1 illustrates a block diagram of an optical system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

The present disclosure provides systems and methods for manufacturing an optical system that can beneficially provide reliable and repeatable alignment of a plurality of light-emitters with a corresponding plurality of optical lenses and light guide manifolds (e.g., waveguides and/or light pipes).

An example method includes providing a first substrate, which could include a printed circuit board material (e.g., FR-4) and/or a flexible printed circuit board material. In some embodiments, the first substrate could be approximately 200 microns thick. The first substrate includes a plurality of light-emitter devices, which could be arranged along a surface of the first substrate. In some examples, the method may include causing a die bonder to place the plurality of light-emitter devices on the first substrate. In some embodiments, the first substrate could additionally include a plurality of spring structures. In such scenarios, the spring structures could include the loops of wire bonds provided on the surface of the first substrate. Additionally or alternatively, the spring structures could include a soft material, such as a polymer (e.g., silicone) or another similar material. The spring structures could include, without limitation, one or more elastic materials configured to exert a restoring force in response to being deformed (e.g., compressed).

The method also includes providing a second substrate. In an example embodiment, the second substrate could include glass, although other materials are possible. In some embodiments, a surface of the second substrate could be very flat so as to provide a topographic reference plane.

The method includes forming a raised portion on the second substrate. As an example, the raised portion could include photolithographically-defined materials such as SU-8, PMMA, etc. Other additive and/or subtractive manufacturing methods are contemplated to form the raised portion. In some embodiments, the raised portion could be about 400 microns tall with respect to the topographic reference plane, however other height values for the raised portion are possible and contemplated. The raised portion could be an optical component, such as a light guide manifold.

Additionally, the method includes fixing at least one spacer and at least one cylindrical lens to the second substrate. In an example embodiment, the second substrate includes a plurality of three-dimensional alignment structures (e.g., grippers) that can be used to help position the spacer and the cylindrical lens. In some examples, such alignment structures could be formed with photolithographically-defined materials (e.g., SU-8, PMMA, etc.) or as protrusions/recesses etched onto the second substrate (glass wafer).

In some embodiments, the spacers and the cylindrical lenses could be formed from drawn optical fibers. Accordingly, the spacers and cylindrical lenses could include materials such as glass (silica), polycarbonate, polyethylene, fluoride, chalcogenides, and/or other optical materials. In some embodiments, the material for the spacer and cylindrical lens could be different. For example, because the spacer is not utilized for its optical properties, as such the spacer need not be an optical material at all.

In an example embodiment, the cylindrical lenses could be about 125 microns in diameter and the spacers could be about 50 microns in diameter, although other sizes are possible and contemplated. A benefit to using a drawn fiber for the spacer is that it may have a uniform diameter along its length within a very tight manufacturing tolerance (e.g., 1-10 micron variation, or less).

In example embodiments, the method may include applying an adhesive material to the first substrate and/or the second substrate. In some scenarios, the adhesive material could include an optical epoxy, a UV-curable epoxy, and/or a thermally-curable adhesive. Other types of adhesive materials (e.g., tape films) are contemplated. The adhesive material could be applied at regions that are relatively distant from the light-emitter devices, spacer, cylindrical lens, and/or light guide manifold.

The method includes aligning the first substrate to the second substrate. This alignment step could include two cameras that are arranged to view the first and second substrates through a backside surface of the transparent or translucent second substrate. A first camera could be arranged to view a first set of alignment features on the first and/or the second substrates and the second camera could be arranged to view a second set of alignment features on the first substrate and/or second substrate. In some embodiments, the first and second sets of alignment features could be spaced widely apart along the first and/or second substrate (near the extents of one or both substrates) so as to more easily detect, and correct for, misalignment.

In some embodiments, a vacuum could be applied to the first substrate, for example, using a vacuum chuck, to hold the first substrate in a desired position. In such scenarios, the vacuum chuck could be attached to a positioning stage configured to adjust a position of the first substrate with respect to the second substrate according to a desired proper alignment. As such, the alignment step could include causing the positioning stage to adjust a position of the first substrate so as to align the first and second substrates. For example, an alignment tool could be compliant and/or adjustable about the two axes that are in the substrate plane (e.g., tip/tilt in the x and y axes), but non-compliant with regard to translational motion in x and y directions and rotational motion in the z axis. Additionally or alternatively, such an alignment tool could measure the relative angular and/or translational position of the first and second substrates and actively rotate one or both of them until they are parallel and translationally aligned.

In some embodiments, proper alignment between the first and the second substrates could involve a surface of the light-emitter device being positioned to physically contact the spacer. Furthermore, the light-emitter device could be positioned so as to emit light toward the cylindrical lens. In some embodiments, the cylindrical lens could provide a fast-axis collimation for light emitted by the light-emitter device.

In embodiments that include spring structures (e.g., wire bond loops or a soft polymer material) on the first substrate, proper alignment could also include the spring structures being positioned to physically contact the cylindrical lens on the second substrate.

Once the first and second substrates are aligned, the method includes causing the positioning stage to bring the first substrate in physical contact with the second substrate. In some embodiments, the first substrate could contact the second substrate such that the first substrate forms a "bridge" from a location along the topographical reference plane on the second substrate to a location along the raised portion on the second substrate. For example, when in contact with the second substrate, the first substrate could be angled at an approximate 2 degrees incline with respect to the second substrate.

In such scenarios, the positioning stage may apply, and maintain, a predetermined contact force between the first substrate and the second substrate. In some examples, the predetermined contact force could be between 10 Newtons to 100 Newtons. In some embodiments, an initial alignment contact force (e.g., 10 Newtons) could be maintained during the alignment process. Once alignment is achieved, a higher contact force (e.g., 60 Newtons) could be applied during the curing of the adhesive material.

In some embodiments, the contact force could be provided, at least in part, by physical contact between one or more of the following: 1) the light-emitter device on the first substrate being in contact with the spacer on the second substrate; 2) a spring structure on the first substrate being in contact with the cylindrical lens on the second substrate; and 3) a first portion of the first substrate (e.g., a first end of the first substrate) being in contact with the topographic reference plane and a second portion of the first substrate (e.g., a second end of the first substrate, opposite the first end) being in contact with the raised portion of the second substrate.

In some embodiments, information indicative of the contact force may be provided by one or more strain gauges that could be coupled to the vacuum chuck and/or the positioning stage. In such scenarios, the strain gauges could include one or more load cells (e.g., shear-type, compression-type, load-pin, etc.). The method could include adjusting the positioning stage based on the information provided by the strain gauges so as to achieve and/or maintain the predetermined contact force. Additionally or alternatively, the method could include using the strain gauge information to establish and/or maintain co-planarity of the first and second substrates.

In some embodiments, the method includes, while the predetermined contact force (e.g., 60 Newton) is being maintained, curing the adhesive material so as to permanently bond the first and second substrates. For example, a UV light could be applied to cure UV-curable epoxy. Additionally or alternatively, heat could be applied (e.g., with a heated chuck), so as to cure thermally-curable adhesive materials.

In some embodiments, the method could include "prebending" the first substrate so as to reduce peeling forces that may act to delaminate the first substrate from the second substrate. For example, a pre-bending process could plastically deform the first substrate so as to reduce such peeling forces when the first substrate is subsequently bonded to the second substrate.

II. Example Optical Systems

FIG. 1 illustrates a block diagram of an optical system 100, according to an example embodiment. Optical system 100 could be utilized in various compact LIDAR systems. Such LIDAR systems may be configured to provide information (e.g., point cloud data) about one or more objects (e.g., location, shape, etc.) in a given environment. In an example embodiment, the LIDAR system could provide point cloud information, object information, mapping information, or other information to a vehicle. The vehicle could be a semi- or fully-automated vehicle. For instance, the vehicle could be a self-driving car, an autonomous drone aircraft, an autonomous truck, or an autonomous robot. Other types of vehicles and LIDAR systems are contemplated herein.

The optical system 100 includes a first substrate 110, which has a first surface 112 and a second surface 114 opposite the first surface 112. In some embodiments, the first substrate 110 is a printed circuit board (PCB). However, the first substrate 110 could be formed from a variety of different materials, each of which is contemplated in the present disclosure. In some examples, the first substrate 110 could be approximately 200 microns thick. However, other thicknesses are possible and contemplated.

In various embodiments, the first substrate 110 includes a plurality of spring structures 160 on the first surface 112 of the first substrate 110. The spring structures 160 could provide a compliant, spring-like force in a direction normal to the surface of the first substrate 110. In some cases, the plurality of spring structures 160 could include a plurality of looped wire bonds and/or a soft polymer material. Other types of springs and/or spring-like structures are contemplated herein.

A plurality of light-emitter devices 120 is disposed on the first surface 112 of the first substrate 110. The plurality of light-emitter devices 120 could be configured to provide light pulses in infrared wavelengths (e.g., 905 nm). Other wavelengths and wavelength ranges are possible and contemplated. The plurality light-emitter devices 120 could each include one or more laser bars or another type of light-emitting structure. In some embodiments, control circuitry (e.g., pulser circuits) for the plurality of light-emitter devices 120 could also be disposed along the first surface 112 of the first substrate 110. In other embodiments, the control circuitry could be located elsewhere.

The optical system 100 also includes a second substrate 130 that has a mounting surface 132 that defines a reference plane. The second substrate 130 also includes a structure 136 and an optical spacer 137 on the mounting surface 132. In some cases, the structure 136 may be formed from a polymeric material, such as photoresist. For example, the polymeric material may include SU-8 polymer, Kloe K-CL negative photoresist, Dow PHOTOPOSIT negative photoresist, or JSR negative tone THB photoresist. It will be understood that the structure 136 may be formed from other polymeric photo-patternable materials. The structure 136 could be a photo-patterned material layer that is 400 microns thick. However, the structure 136 could be a different thickness.

The structure 136 may include an optical waveguide configured to efficiently guide light along a propagation direction. For example, the structure 136 may be configured to couple light emitted from the plurality of light-emitter devices 120. At least a portion of such light may be guided within at least a portion of the structure 136 via total internal reflection. In some embodiments, the structure 136 may include one or more reflective surfaces configured to direct light normal to the propagation direction. In such a scenario, at least a portion of the light may be coupled out of the structure 136 via a mirrored facet.

In some embodiments, the optical spacer 137 could be provided to improve optical isolation between the structure 136 and the first substrate 110 and/or to preserve the light guiding properties of the structure 136. For instance, in some scenarios, the optical spacer 137 could include a partially-etched stainless steel spacer that forms a "tunnel" or air gap around the structure 136. In other words, such an optical spacer 137 could be directly "sandwiched" between the first substrate 110 and the second substrate 130 in the region of the structure 136. That is, air—or another material with a low refractive index with respect to that of the structure 136—could surround at least a portion of the structure 136. In such scenarios, the structure 136 need not be directly coupled to the first substrate 110, but rather could be indirectly coupled to the first substrate 110 by way of the optical spacer 137.

Put another way, in some embodiments, the optical spacer 137 may provide a "scaffolding" around the structure 136 so as to prevent the first substrate 110 from physically touching the structure 136. The optical spacer 137 could be formed from copper, stainless steel, or a nickel-cobalt ferrous alloy such as Kovar. Additionally or alternatively, the material of the optical spacer 137 could be selected based on its coefficient of thermal expansion (CTE). Specifically, the optical spacer 137 could be formed from a material that has a CTE similar (e.g., within 10% or 1%) to that of the second substrate 130.

The second substrate 130 includes at least one spacer 140 coupled to the mounting surface 132. In some embodiments, the at least one spacer 140 could be cylindrical with a diameter between 40-60 microns. However, other diameters or shapes for the at least one spacer 140 are possible and contemplated. In some embodiments, the at least one spacer 140 could be coupled to the mounting surface 132 with epoxy or another type of adhesive. Additionally or alternatively, the at least one spacer 140 could be disposed between at least one pair of guide structures. The at least one pair of guide structures could be configured to secure the at least one spacer 140 from moving away to a predetermined location.

The second substrate 130 also includes at least one cylindrical lens 150 (or other shaped lens) coupled to the mounting surface 132. In some embodiments, the at least one cylindrical lens 150 could be coupled to the mounting surface 132 with epoxy or another type of adhesive. Additionally or alternatively, the at least one cylindrical lens 150 could be disposed between at least one pair of guide structures. The at least one pair of guide structures could be configured to secure the at least one cylindrical lens 150 to a predetermined location. In an example embodiment, the cylindrical lens 150 could be utilized to focus, defocus, direct, and/or otherwise couple the emitted light into the structure 136. In some embodiments, the cylindrical lens 150 could be approximately 100-200 microns in diameter. However, other diameters are possible and contemplated. In addition, lenses that are in other shapes could be used instead of or in addition to the at least one cylindrical lens 150.

The first substrate 110 and the second substrate 130 are coupled together such that a first portion 116 of the first substrate 110 is coupled to the optical spacer 137 on the mounting surface 132 of the second substrate 130. The first surface 112 of the first substrate 110 faces the mounting surface 132 of the second substrate 130 at an angle with respect to the reference plane.

In some embodiments, the at least one spacer 140 and/or the at least one cylindrical lens 150 could include an optical fiber. In other embodiments, the at least one spacer 140 and/or the at least one cylindrical lens 150 could include materials such as glass (silica), polycarbonate, polyethylene, fluoride, chalcogenides, and/or other optical materials. In yet other embodiments, the at least one spacer 140 need not be an optical material at all. In such scenarios, the at least one spacer 140 could be formed from silicon, ceramic, or another optically opaque material.

In some embodiments, the first substrate 110 includes a plurality of spring structures 160 on the first surface 112 of the first substrate 110. The first substrate 110 and the second substrate 130 are coupled together such that: a) at least one light-emitter device of the plurality of light-emitter devices 120 is in physical contact with the at least one spacer 140; and b) at least one spring structure of the plurality of spring structures 160 is in physical contact with the at least one cylindrical lens 150.

Figure 2:
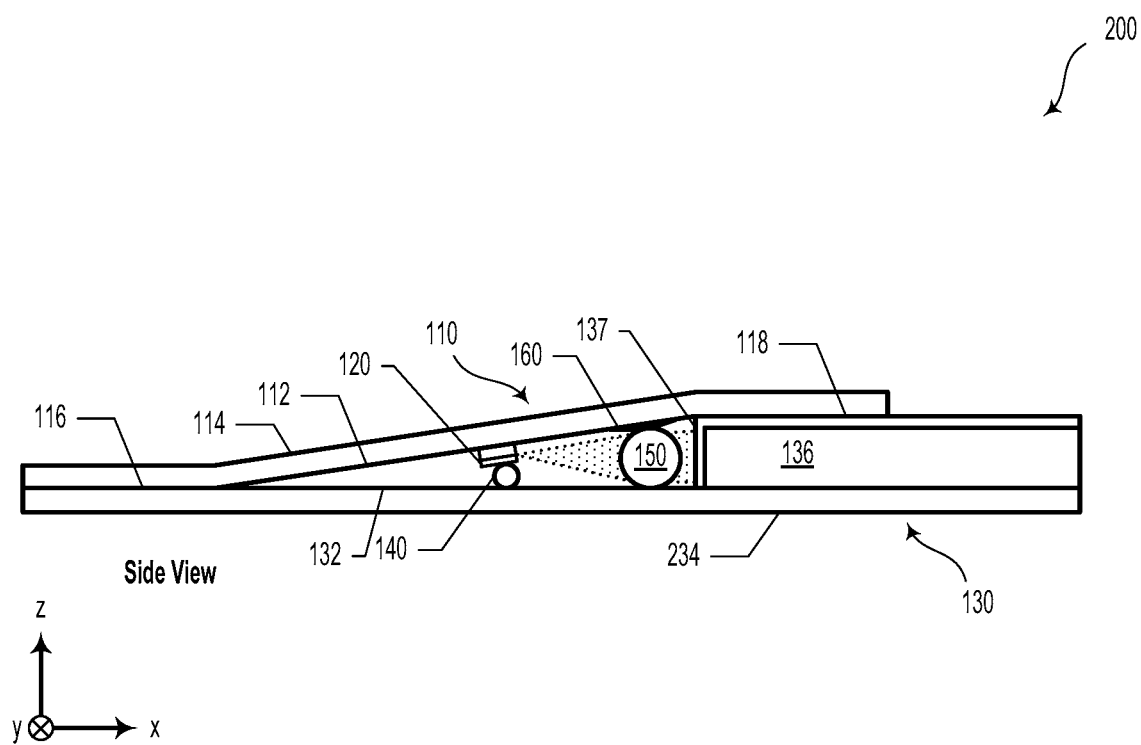
FIG. 2 illustrates an optical system, according to an example embodiment.
Figure 2:
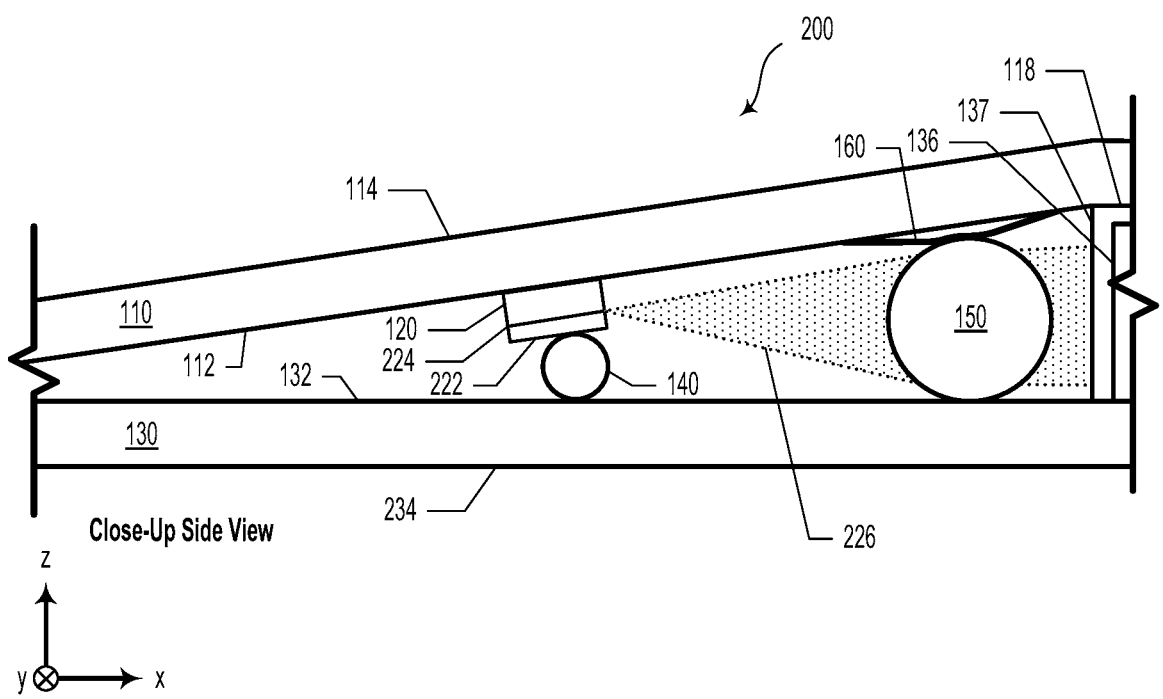

FIG. 2 illustrates a side view and close-up side view of optical system 200, according to an example embodiment. Optical system 200 could be similar or identical to optical system 100, as illustrated and described in reference to FIG. 1. For example, optical system 200 includes a first substrate 110 and a second substrate 130. A plurality of light-emitter devices 120 are coupled to a first surface 112 of the first substrate 110. While FIG. 2 illustrates a single light-emitter device 120, in some embodiments, the light-emitter device 120 could include a plurality of light-emitter devices (e.g., 256 or more laser bars). In an example embodiment, the plurality of light-emitter devices could extend "into the page" along the y-axis.

In some embodiments, a plurality of spring structures 160 could be coupled to the first surface 112 of the first substrate 110. While FIG. 2 illustrates a single spring structure 160, in some embodiments, the optical system 200 could include a plurality of spring structures (e.g., 10, 50, 100, or more spring structures). In an example embodiment, the plurality of spring structures 160 could extend "into the page" along the y-axis.

The second substrate 130 has a mounting surface 132 upon which is mounted a spacer 140, a cylindrical lens 150, a structure 136, and an optical spacer 137. In an example embodiment, the cylindrical lens 150 could be disposed along the mounting surface 132 and between the spacer 140 and the structure 136. The spacer 140 and the cylindrical lens 150 could be cylindrically-shaped and extend along the y-axis as illustrated in FIG. 2. However, other shapes and arrangements of the spacer 140, cylindrical lens 150, structure 136, and optical spacer 137 are possible and contemplated. In some embodiments, the second substrate 130 could be partially transparent. As an example, the second substrate 130 could be glass or another material that is substantially optically-transparent in the visible wavelengths.

The first substrate 110 is coupled to the second substrate 130 at least at two locations: 1) a first portion 116 of the first substrate 110 could be coupled to the mounting surface 132 of the second substrate 130; and 2) a second portion 118 of the first substrate 110 could be coupled to the optical spacer 137 on the second substrate 130. In such a scenario, the first surface 112 of the first substrate 110 faces the mounting surface 132.

In some embodiments, coupling the first substrate 110 to the second substrate 130 could include bonding the two substrates using an epoxy or another optical adhesive material. Coupling the first substrate 110 and the second substrate 130 as illustrated in FIG. 2 could cause a top surface 222 of the at least one light-emitter device 120 to physically contact the spacer 140. As such, the spacer 140 could be configured to act as a "land" or stop for the light-emitter device 120 in the z-direction. That is, the spacer 140 could control the z-height of the light-emitter device 120 when the first substrate 110 is coupled to the second substrate 130.

The light-emitter device 120 could include an epitaxially-grown laser diode region 224. The laser diode region 224 could include semiconductor material from which photons are emitted with a particular emission pattern. By controlling the z-height of the light-emitter device 120, the location of the emission pattern 226 of the epitaxially-grown laser diode region 224 can be positioned so as to interact with the cylindrical lens 150.

Additionally, coupling the first substrate 110 to the second substrate 130 could cause a spring structure 160 to physically contact the cylindrical lens 150. That is, at least a portion of the spring structure 160 could push downward (in the −z direction) onto an outer surface of the cylindrical lens 150. In so doing, the spring structure 160 could help retain and/or position the cylindrical lens 150 at a desired location.

III. Example Methods

FIGS. 3A-3G illustrate various steps of a method of manufacture, according to one or more example embodiments. It will be understood that at least some of the various steps may be carried out in a different order than of that presented herein. Furthermore, steps may be added, subtracted, transposed, and/or repeated. FIGS. 3A-3G may serve as example illustrations for at least some of the steps or stages described in relation to method 400 as illustrated and described in relation to FIG. 4. Additionally, some steps of FIGS. 3A-3G may be carried out so as to provide optical system 100, as illustrated and described in reference to FIGS. 1 and 2.

Figure 3A:
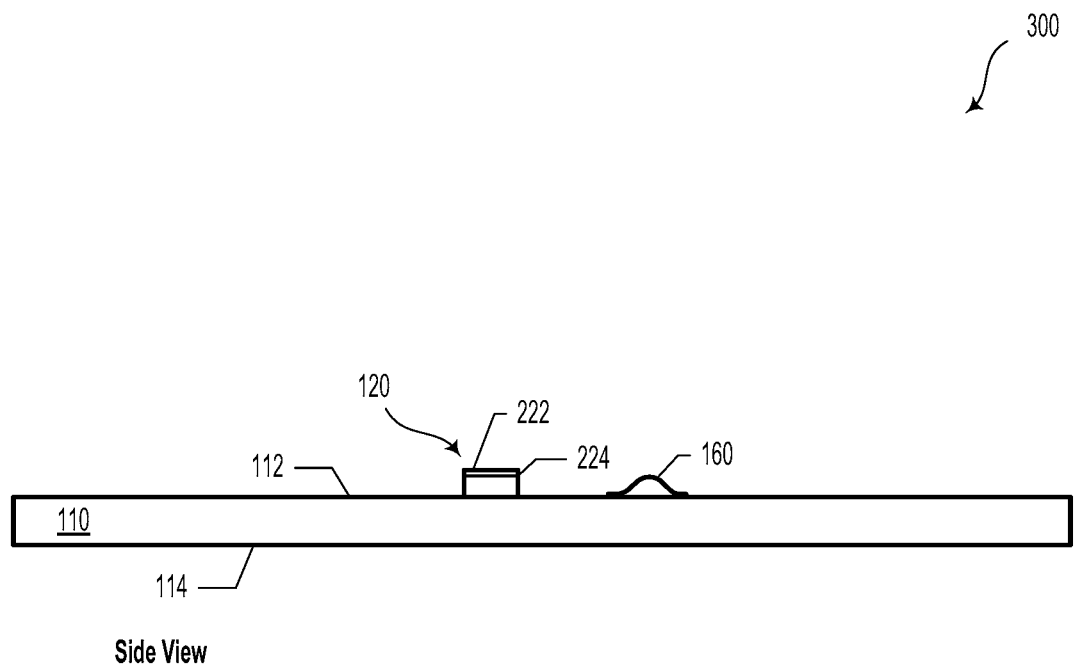
FIG. 3A illustrates a step of a method of manufacture, according to an example embodiment.
Figure 3A:
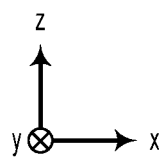

FIG. 3A illustrates a step of a method of manufacture 300, according to an example embodiment. Step 300 includes providing a first substrate 110. As illustrated, a first substrate 110 could include a first surface 112 and a second surface 114. A plurality of light-emitter devices 120 could be disposed on the first surface 112. The plurality of light-emitter devices 120 could extend along the y-axis. In some embodiments, an epitaxially-grown laser diode region 224 could be located a known distance below a top surface 222 of the light-emitter devices 120. A plurality of spring structures 160 could be placed on the first surface 112. For example, the spring structures 160 could include wire bonds applied to the first surface 112 using a wire bonder. Additionally or alternatively, the spring structures 160 could include a soft polymer material, which could be applied with a pipette, a syringe, or another type of applicator.

Figure 3B:
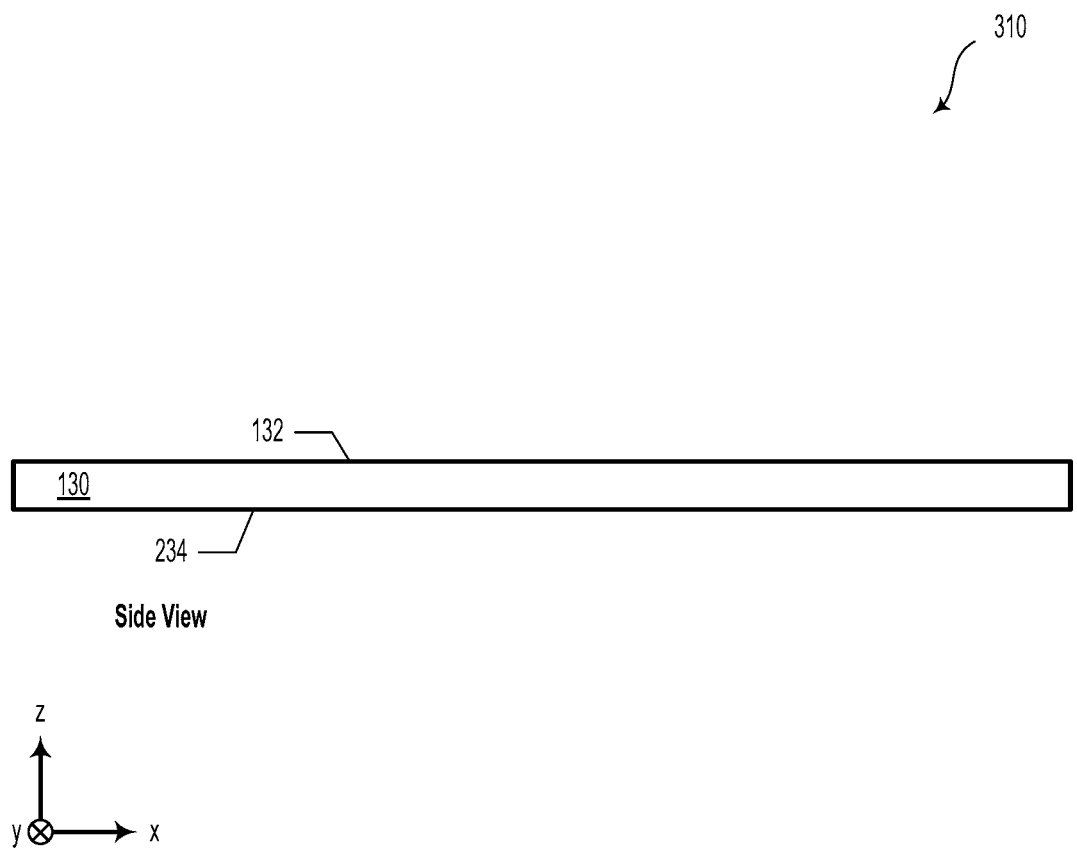
FIG. 3B illustrates a step of a method of manufacture, according to an example embodiment.

FIG. 3B illustrates a step of a method of manufacture 310, according to an example embodiment. Step 310 includes providing a second substrate 130. The second substrate 130 includes a mounting surface 132 and a backside surface 234. In some embodiments, the second substrate 130 may be partially or completely transparent. For instance, the second substrate 130 could be formed from glass or another material that is substantially transparent to visible light.

Figure 3C:
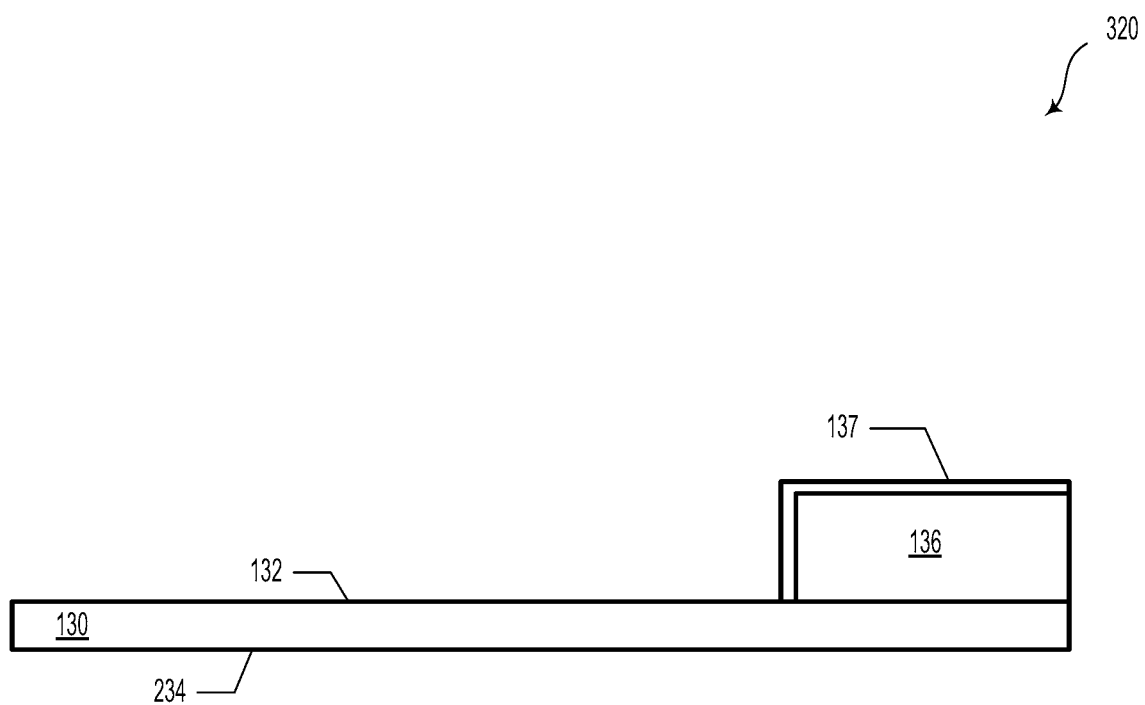
FIG. 3C illustrates a step of a method of manufacture, according to an example embodiment.
Figure 3C:
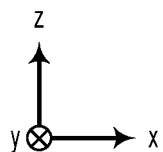

FIG. 3C illustrates a step of a method of manufacture 320, according to an example embodiment. Step 320 includes forming a structure 136 and optical spacer 137 on the mounting surface 132. In some embodiments, forming the structure 136 could include one or more photolithography exposures to define a photo-definable resist material. In some embodiments, the structure 136 could be an optical waveguide configured to guide light via, e.g., total internal reflection. As described elsewhere herein, the optical spacer 137 could include a stainless steel "scaffolding" to maintain an air gap around the structure 136.

Figure 3D:
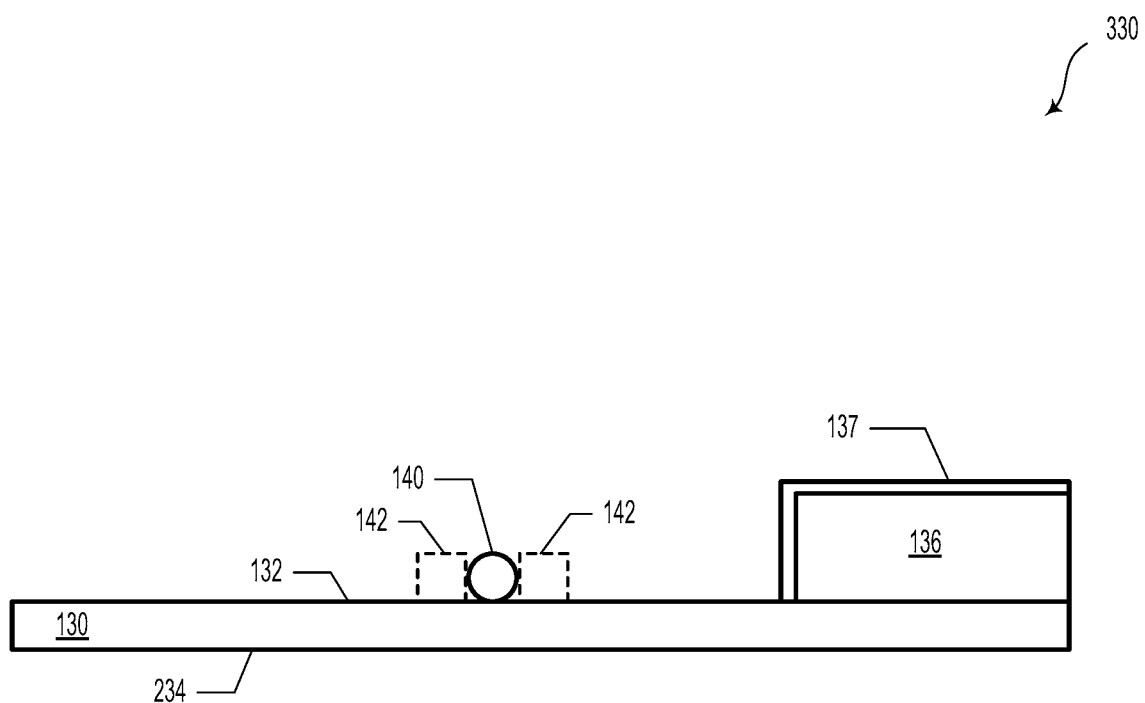
FIG. 3D illustrates a step of a method of manufacture, according to an example embodiment.
Figure 3D:
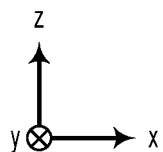

FIG. 3D illustrates a step of a method of manufacture 330, according to an example embodiment. Step 330 includes coupling a spacer 140 to the mounting surface 132 of the second substrate 130. In some embodiments, coupling the spacer 140 to the mounting surface 132 could include using a pick-and-place system to position the spacer 140 in a desired location along the mounting surface 132. Additionally or alternatively, the spacer 140 could be coupled to the mounting surface 132 using epoxy or another adhesive material.

In some embodiments, three-dimensional alignment structures 142 could be applied to the mounting surface before or after the spacer 140 is positioned along the mounting surface 132. The alignment structures 142 could help to properly position the spacer 140 and/or help maintain its position. In some cases, the alignment structures 142 could be positioned to form a slot for the spacer 140. In other words, the alignment structures 142 could grip the spacer 140 so as to affix or fasten it in place. The alignment structures 142 could be defined using photolithography. For example, the alignment structures 142 could be formed with a photo-definable material.

Figure 3E:
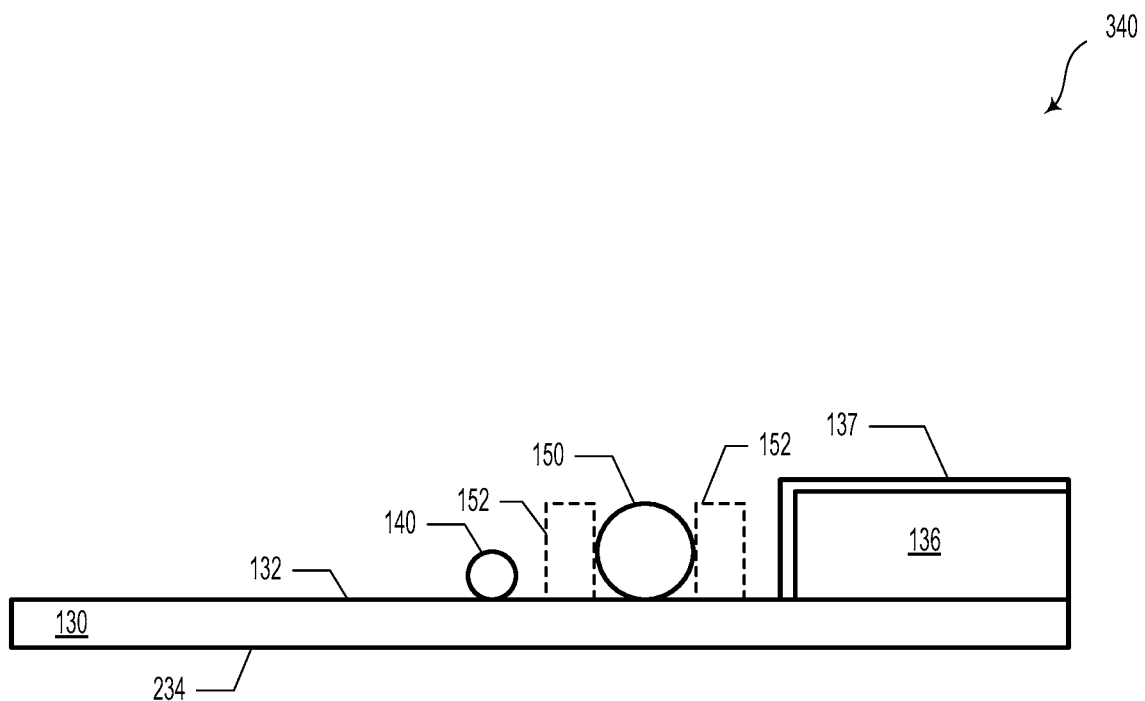
FIG. 3E illustrates a step of a method of manufacture, according to an example embodiment.
Figure 3E:
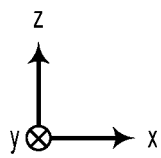

FIG. 3E illustrates a step of a method of manufacture 340, according to an example embodiment. Step 340 includes coupling a cylindrical lens 150 to the mounting surface 132 of the second substrate 130. In some embodiments, coupling the cylindrical lens 150 to the mounting surface 132 could include using a pick-and-place system to position the cylindrical lens 150 in a desired location along the mounting surface 132. Additionally or alternatively, the cylindrical lens 150 could be coupled to the mounting surface 132 using epoxy or another adhesive material.

In some embodiments, three-dimensional alignment structures 152 could be applied to the mounting surface before or after the cylindrical lens 150 is positioned along the mounting surface 132. The alignment structures 152 could help to properly position the cylindrical lens 150 and/or help maintain its position. In some cases, the alignment structures 152 could be positioned to form a slot for the cylindrical lens 150. In other words, the alignment structures 152 could grip the cylindrical lens 150 so as to affix or fasten it in place. The alignment structures 152 could be defined using photolithography. For example, the alignment structures 152 could be formed with a photo-definable material.

Figure 3F:
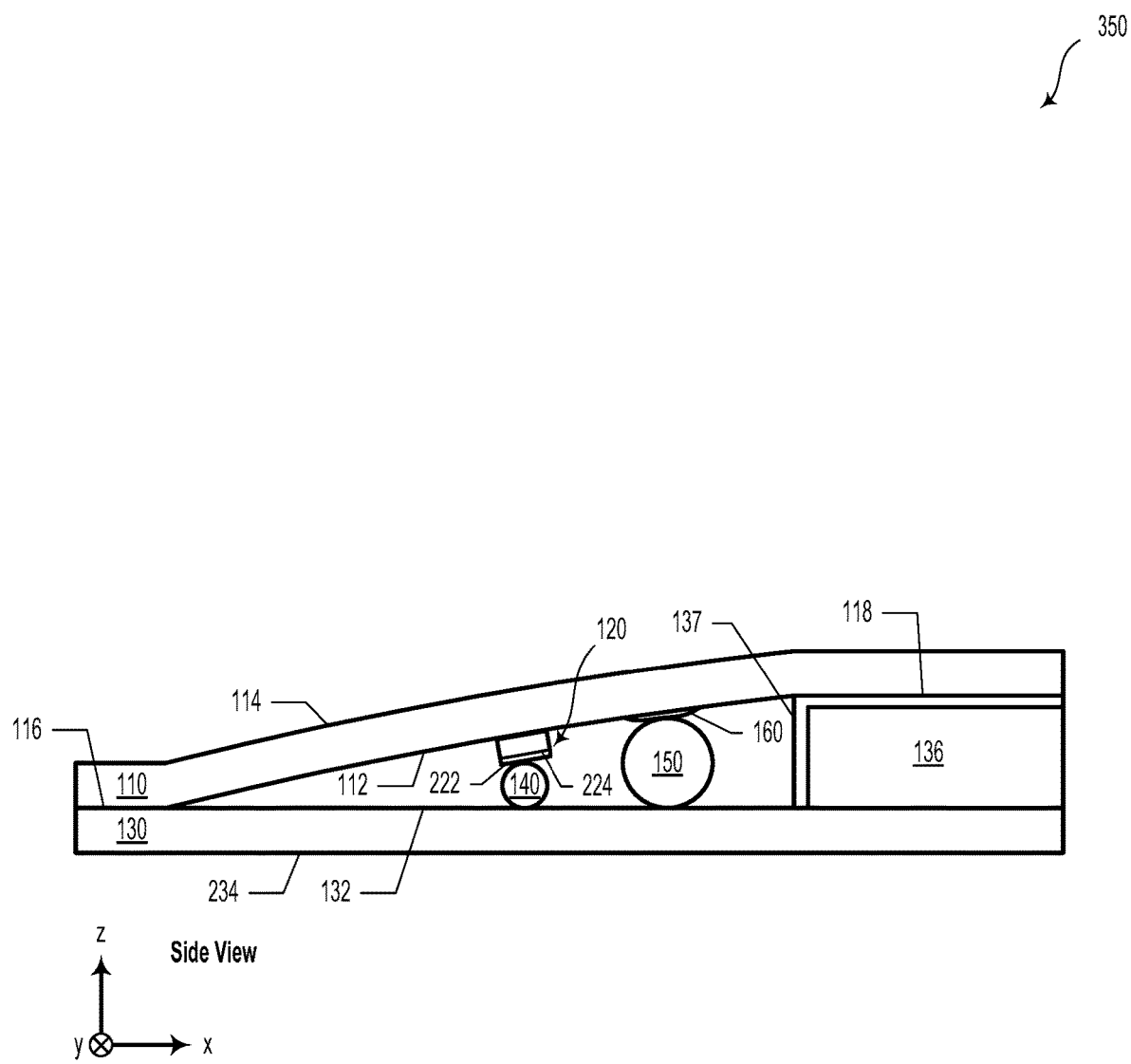
FIG. 3F illustrates a step of a method of manufacture, according to an example embodiment.

FIG. 3F illustrates a step of a method of manufacture 350, according to an example embodiment. Step 350 includes the first substrate 110 being coupled to the second substrate 130. Namely, a first portion 116 of the first substrate 110 is coupled to the mounting surface 132 of the second substrate 130 and a second portion 118 of the first substrate 110 is coupled to the optical spacer 137. In so doing, the first surface 112 of the first substrate 110 faces the mounting surface 132.

When coupling the first substrate 110 to the second substrate 130, the plurality of light-emitter devices 120 could come into physical contact with the spacer 140. That is, a respective top surface 222 of the plurality of light-emitter devices 120 could push against the spacer 140. Furthermore, as a result of coupling the first substrate 110 and the second substrate 130, the cylindrical lens 150 could come into physical contact with the spring structures 160. Namely, in some embodiments, the spring structures 160 may bend so as to compliantly provide a force to a surface of the cylindrical lens 150. In this arrangement, an epitaxially-grown laser diode region 224 could be positioned with respect to the cylindrical lens 150 such that the laser diode region 224 emits light that is fast-axis collimated by the cylindrical lens 150.

In some embodiments, the first substrate 110 may bend due to one or more physical forces exerted upon it. For example, the first surface 112 and the second surface 114 could be bent with respect to a pre-coupling condition of the first substrate 110. That is, prior to coupling the first substrate 110 to the second substrate 130, the first substrate 110 may be substantially planar. However, after coupling the first substrate 110 to the second substrate 130, at least a portion of the first substrate 110 may bend to balance the forces exerted upon the top surface 222 of the light-emitter device 120 by the spacer 140 and/or the forces exerted upon the cylindrical lens 150 by the spring structure 160, and vice versa.

In some examples, the first substrate 110 may be "pre-bent" prior to coupling it with the second substrate 130. In such a scenario, the first substrate 110 could be plastically deformed with heat and/or pressure so as to more compliantly couple with the second substrate 130. For example, the first portion 116 of the first substrate 110 and the second portion 118 of the first substrate 110 could be pre-bent so as to reduce delamination issues after coupling with the second substrate 130. Other "pre-bending" steps are contemplated so as to reduce or eliminate physical stresses on the first substrate 110, the second substrate 130, and/or other components of the optical system 100.

Figure 3G:
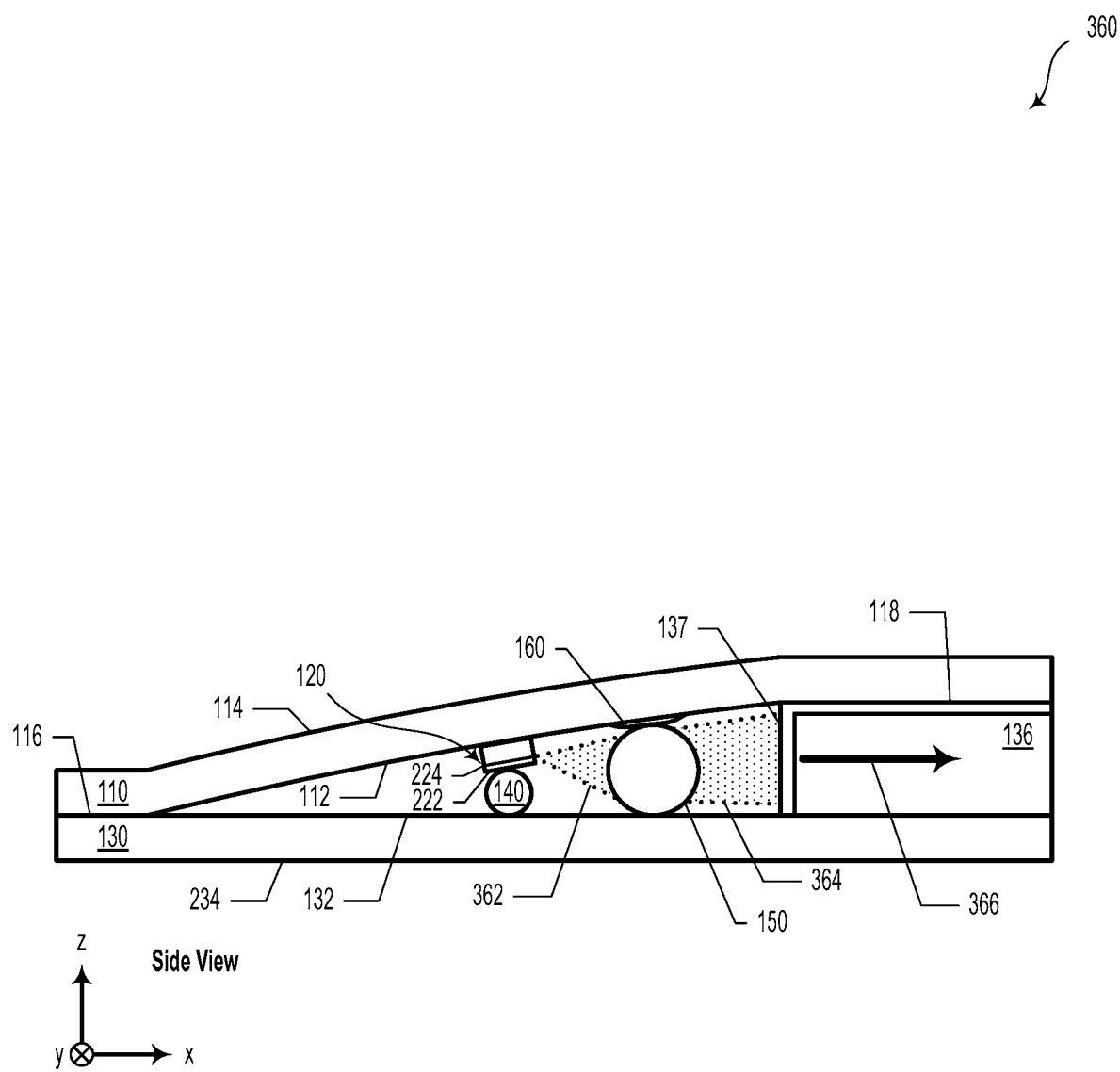
FIG. 3G illustrates a step of a method of manufacture, according to an example embodiment.

FIG. 3G illustrates a step of a method of manufacture 360, according to an example embodiment. Step 360 could include causing the plurality of light-emitter devices 120 to emit light according to an emission pattern 362. At least a portion of the emission pattern 362 could interact with the cylindrical lens 150. In such a scenario, the focused light 364 could be coupled into the structure 136 and be propagated within the structure 136 along the x-direction as guided light 366. The guided light 366 could be imaged elsewhere in the optical system using, for example, one or more photodetectors (e.g., a camera). Step 360 could be utilized, for example, as a calibration step during manufacturing or periodically during normal operation to check proper alignment of the components of the optical system 100. By way of example, alignment of the optical system 100 could be checked/maintained with automated optical inspection (AOI) techniques. For example, AOI could confirm alignment of the first and second substrates by checking fiducial marks, optical vernier marks, or other types of alignment indicators. In some cases, the AOI could include observing such marks by imaging through a transparent portion of the second substrate 130.

Figure 4:
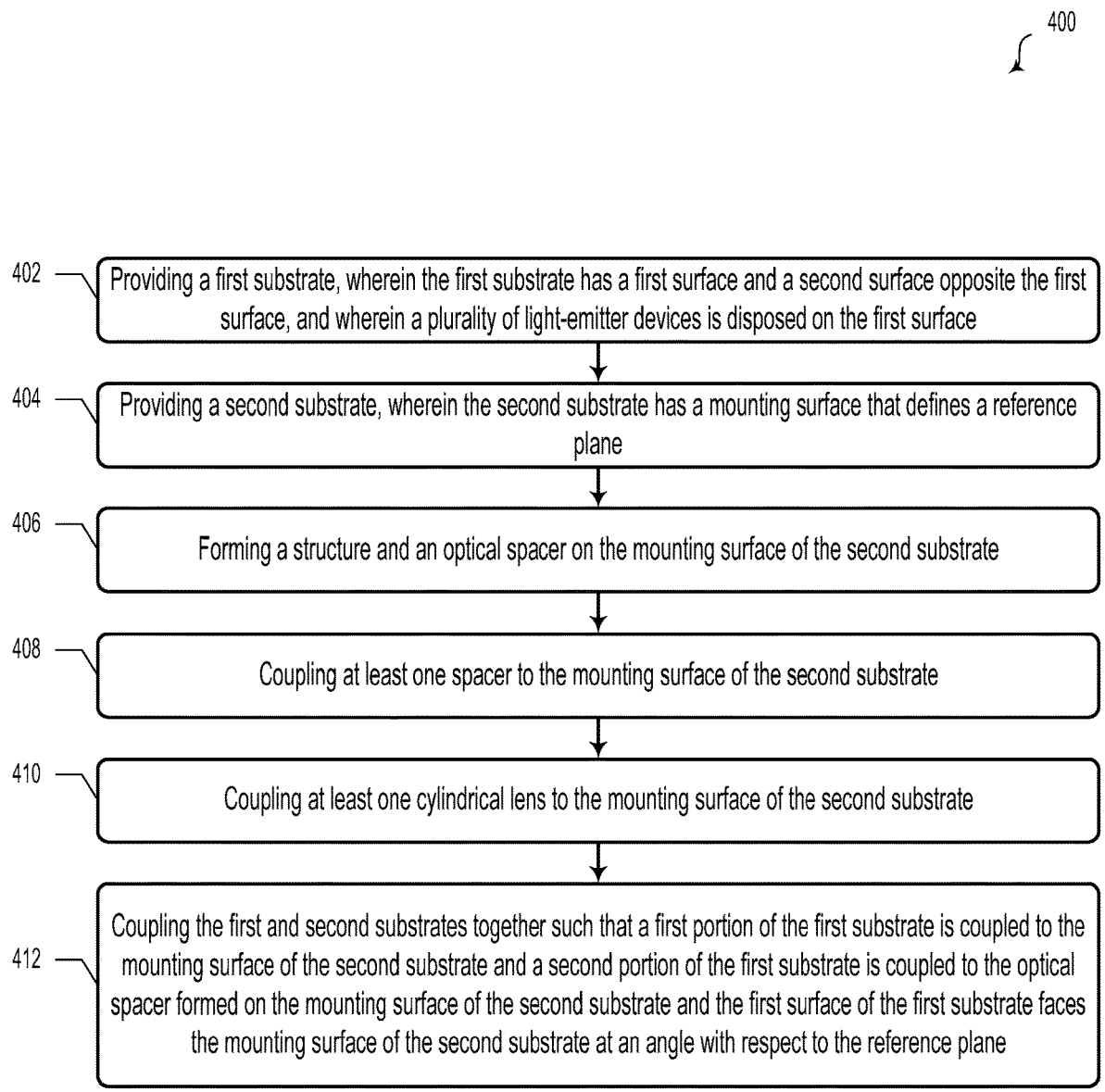
FIG. 4 illustrates a method, according to an example embodiment.

FIG. 4 illustrates a method 400, according to an example embodiment. Method 400 may be carried out, at least in part, by way of some or all of the manufacturing steps or blocks illustrated and described in reference to FIGS. 3A-3G. It will be understood that the method 400 may include fewer or more steps or blocks than those expressly disclosed herein. Furthermore, respective steps or blocks of method 400 may be performed in any order and each step or block may be performed one or more times. In some embodiments, method 400 and its steps or blocks may be performed to provide an optical system that could be similar or identical to optical system 100, as illustrated and described in reference to FIGS. 1 and 2.

Block 402 includes providing a first substrate that has a first surface and a second surface opposite the first surface. In some examples, the first substrate could include a printed circuit board. However, other materials are contemplated. A plurality of light-emitter devices is disposed on the first surface of the first substrate. As such, method 400 could include using a pick-and-place system to position the light-emitter devices on the first surface. In some scenarios, the light-emitter devices could be bonded to the first surface with epoxy, an indium eutectic material, or another type of adhesive material.

Method 400 could additionally include electrically-connecting the light-emitter devices to control circuitry (e.g., pulser circuits), which could be located on the first substrate or elsewhere. For example, electrically-connecting the light-emitter devices to their respective control circuits could include forming one or more wire bonds between them using a wire or ribbon bonder system.

Block 404 includes providing a second substrate that has a mounting surface defining a reference plane. The second substrate could include at least one portion that is transparent so as to provide an alignment window for aligning the second substrate with the first substrate as described below.

Block 406 includes forming a structure and an optical spacer on the mounting surface of the second substrate. In some embodiments, forming the structure on the mounting surface of the second substrate comprises performing a photolithographic process to define the structure with a photolithographically-definable material. In some embodiments, the structure could include an optical waveguide that could be formed from SU-8 or another optical material. As described elsewhere herein, the optical spacer could be formed from stainless steel and could provide a scaffolding to maintain an air gap around the structure.

Block 408 includes coupling at least one spacer to the mounting surface of the second substrate. In some embodiments, coupling the at least one spacer to the mounting surface could include using a pick-and-place machine to position the at least one spacer in the desired location on the second substrate. As described elsewhere herein, the at least one spacer could include an optical fiber. However, other materials and shapes are possible and contemplated.

Block 410 includes coupling at least one cylindrical lens to the mounting surface of the second substrate. In some embodiments, coupling the at least one spacer or the at least one cylindrical lens to the mounting surface of the second substrate could include coupling the at least one spacer or the at least one cylindrical lens to a plurality of three-dimensional alignment structures on the mounting surface of the second substrate.

Block 412 includes coupling the first and second substrates together such that a first portion of the first substrate is coupled to the mounting surface of the second substrate and a second portion of the first substrate is coupled to the optical spacer formed on the mounting surface of the second substrate and the first surface of the first substrate faces the mounting surface of the second substrate at an angle with respect to the reference plane.

In some embodiments, the structure formed on the mounting surface of the second substrate could be an optical waveguide. In such scenarios, coupling the first and second substrates together comprises optically coupling at least one light-emitter device of the plurality of light-emitter devices to the optical waveguide via the at least one cylindrical lens.

In example embodiments, coupling the first and second substrates together includes bringing at least one light-emitter device of the plurality of light-emitter devices into physical contact with the at least one spacer.

In some embodiments, providing the first substrate could include forming a plurality of spring structures on the first surface of the first substrate. In such scenarios, coupling the first and second substrates together could include bringing at least one spring structure of the plurality of spring structures into physical contact with the at least one cylindrical lens. In some cases, the plurality of spring structures could include a plurality of looped wire bonds. That is, method 400 could include the step of applying the plurality of looped wire bonds to the first surface of the first substrate (e.g., with a wire bonding system).

Additionally or alternatively, the spring structures could include a soft polymer material. In such scenarios, the soft polymer material could be applied, by hand or with an automated system, using a pipette, a syringe, or another type of applicator.

In some embodiments, coupling the first and second substrates together could include applying an adhesive material to at least one of the first portion of the first substrate or the mounting surface of the second substrate. In such scenarios, the method 400 could include applying the adhesive material to at least one of the second portion of the first substrate or the optical spacer formed on the mounting surface of the second substrate. Furthermore, method 400 could include curing the adhesive material such that the first portion of the first substrate is bonded to the mounting surface of the second substrate and the second portion of the first substrate is bonded to the optical spacer formed on the mounting surface of the second substrate.

Method 400 may include aligning the first substrate and the second substrate with respect to one another before coupling the first and second substrates together. For instance, in some embodiments where the second substrate includes a transparent portion, aligning the first substrate and the second substrate with respect to one another could include imaging at least a portion of the first substrate through the transparent portion of the second substrate. Furthermore, in such scenarios, aligning the first substrate and the second substrate with respect to one another may include adjusting a position of the first substrate with respect to the second substrate to achieve a desired alignment of the first and second substrates.

Additionally or optionally, coupling the first and second substrates together could include applying a predetermined force (e.g., between 10 Newtons to 100 Newtons) to the second surface of the first substrate. Other values of force are contemplated and possible.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method for manufacturing an optical system, the method comprising:
providing a first substrate, wherein the first substrate has a first surface and a second surface opposite the first surface, and wherein a plurality of light-emitter devices is disposed on the first surface;
providing a second substrate, wherein the second substrate has a mounting surface that defines a reference plane, wherein a spacer and a cylindrical lens are coupled to the mounting surface; and
coupling the first and second substrates together such that the first surface of the first substrate faces the mounting surface of the second substrate at an angle with respect to the reference plane and at least one light-emitter device of the plurality of light-emitter devices is in physical contact with the spacer.

2. The method of claim 1, wherein a plurality of spring structures is disposed on the first surface of the first substrate.

3. The method of claim 2, wherein the plurality of spring structures comprises at least one of a plurality of looped wire bonds or a soft polymer material.

4. The method of claim 2, wherein coupling the first and second substrates together comprises bringing at least one spring structure of the plurality of spring structures into physical contact with the cylindrical lens.

5. The method of claim 1, wherein the first substrate comprises a printed circuit board.

6. The method of claim 1, wherein an optical waveguide is disposed on the mounting surface of the second substrate.

7. The method of claim 6, wherein coupling the first and second substrates together comprises optically coupling at least one light-emitter device of the plurality of light-emitter devices to the optical waveguide via the cylindrical lens.

8. The method of claim 1, wherein the spacer and the cylindrical lens are positioned on the mounting surface by a plurality of three-dimensional alignment structures.

9. The method of claim 8, further comprising:
photolithograhically forming the three-dimensional alignment structures on the mounting surface.

10. The method of claim 1, further comprising:
aligning the first substrate and the second substrate with respect to one another before coupling the first and second substrates together.

11. The method of claim 10, wherein the second substrate comprises a transparent portion and wherein aligning the first substrate and the second substrate with respect to one another comprises imaging at least a portion of the first substrate through the transparent portion of the second substrate.

12. An optical system, comprising:
a first substrate, wherein the first substrate has a first surface and a second surface opposite the first surface;
a plurality of light-emitter devices disposed on the first surface of the first substrate;
a second substrate, wherein the second substrate has a mounting surface that defines a reference plane;
a spacer coupled to the mounting surface of the second substrate; and
a cylindrical lens coupled to the mounting surface of the second substrate,
wherein the first substrate and the second substrate are coupled together such that the first surface of the first substrate faces the mounting surface of the second substrate at an angle with respect to the reference plane and at least one light-emitter device of the plurality of light-emitter devices is in physical contact with the spacer.

13. The optical system of claim 12, further comprising:
a plurality of spring structures disposed on the first surface of the first substrate.

14. The optical system of claim 13, wherein the plurality of spring structures comprises at least one of a plurality of looped wire bonds or a soft polymer material.

15. The optical system of claim 13, wherein the first substrate and the second substrate are coupled together such that at least one spring structure of the plurality of spring structures is in physical contact with the cylindrical lens.

16. The optical system of claim 12, further comprising:
a plurality of three-dimensional alignment structures disposed on the mounting surface of the second substrate, wherein the three-dimensional alignment structures position the spacer and the cylindrical lens on the mounting surface.

17. The optical system of claim 12, further comprising:
an optical waveguide disposed on the mounting surface of the second substrate, wherein the first and second substrates are coupled together such that at least one light-emitter device of the plurality of light-emitter devices is optically coupled to the optical waveguide via the cylindrical lens.

18. The optical system of claim 12, wherein at least one of the spacer or the cylindrical lens comprises an optical fiber.

19. The optical system of claim 12, wherein the first substrate comprises a printed circuit board.

20. The optical system of claim 12, wherein at least a portion of the second substrate is transparent.

* * * * *